INVENTOR.
Charles G. Robinson

July 23, 1968    C. G. ROBINSON    3,394,215
COOLING RINGS FOR ELECTRODE PORTS OF ELECTRIC FURNACES
Filed Aug. 1, 1966    2 Sheets-Sheet 2
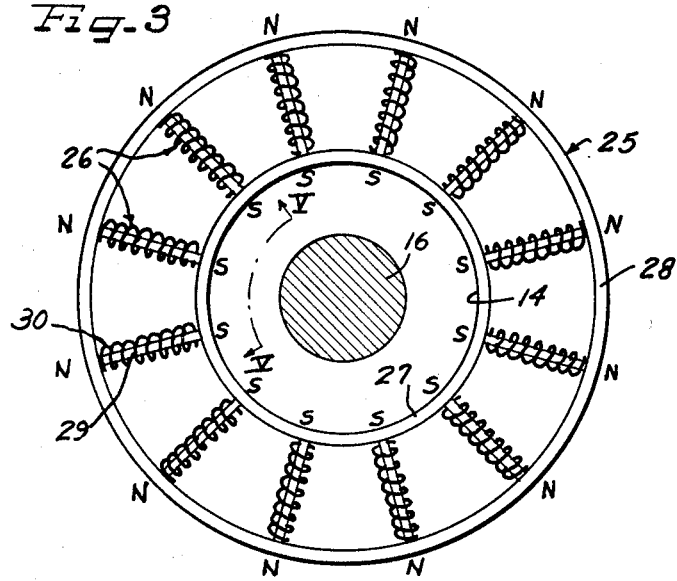
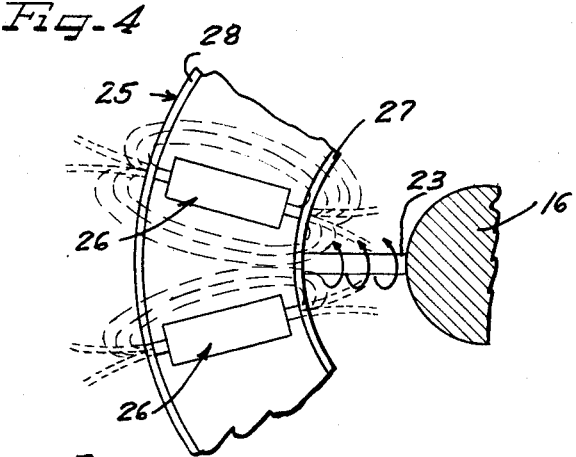
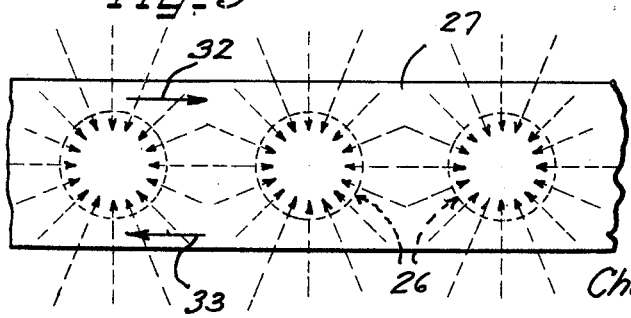
INVENTOR.
Charles G. Robinson
BY           ATTORNEYS United States Patent Office 3,394,215
Patented July 23, 1968

3,394,215
COOLING RINGS FOR ELECTRODE PORTS
OF ELECTRIC FURNACES
Charles G. Robinson, Sterling, Ill., assignor to Northwestern Steel and Wire Company, Sterling, Ill., a corporation of Illinois
Filed Aug. 1, 1966, Ser. No. 569,119
7 Claims. (Cl. 13—9)

This invention relates generally to electric arc furnaces, and more particularly to an improved cooling ring which is mounted on the roof thereof and which is positioned about a current carrying electrode passing therethrough. Specifically, the present invention is directed to a method and apparatus for reducing arc erosion of the cooling ring positioned about the electrode.

In general, electric arc furnaces are provided with one or more current carrying electrodes passing through the roof of the furnace. A cooling ring is mounted on top of the roof and is positioned about the electrode. An annular space is provided between the electrode and the cooling ring to allow hot gases which are formed within the furnace to escape therethrough. The cooling ring, which is exposed to the hot gases, may be provided with passages for receiving a cooling liquid which continuously flows through the ring.

Heretofore, such cooling rings have been seriously damaged due to electric arcs which may be established between the electrode and the cooling ring. In many cases, the electric arc erosion which is caused by the electric arc is sufficient to penetrate into the coolant receiving passage within the cooling ring, thereby allowing the coolant to escape.

When a cooling ring of this type is damaged, it is very inefficient to stop the steel melting process to replace the ring. Therefore, the damaged ring is usually left in place until the end of the melting process. In so doing, further damage is caused to the roof of the electric arc furnace in the vicinity of the cooling ring. The damage to the roof of the furnace is costly in that it disables the use of the furnace until the roof is repaired.

Therefore, one of the primary objects of the present invention is to provide a new and improved cooling ring which can be mounted on the roof of an electric arc furnace.

Another object of the present invention is to provide a method for eliminating arc erosion of a cooling ring which is mounted on the roof of an electric arc furnace.

Another object of the present invention is to eliminate excessive heating of the roof of an electric arc furnace, thereby eliminating damage of the refractory material from which the roof is formed.

A feature of the present invention is the use of a force field which is induced radially inwardly of a cooling ring to cause the arc path of an electric arc which may be established between the cooling ring and an electrode to rotate about the inner periphery of the cooling ring.

Briefly, the cooling ring of the present invention includes a plurality of electromagnets which are positioned radially outwardly of the inner surface of the ring. Therefore, a magnetic field is created within the open space of the ring between the inner periphery thereof and the electrode passing therethrough. Therefore, should an electric arc inadvertently be established between the electrode and the cooling ring, the magnetic force field will cause the arc path of the arc to rotate about the electrode and the inner periphery of the cooling ring. This action will reduce the time interval to which the electric arc established between the electrode and the cooling ring will impinge upon any particular surface thereof.

Other objects and features will become more fully realized and understood from the following detailed description when taken in conjunction with the accompanying drawings in which like reference numerals throughout the various views of the drawings are intended to designate similar elements or components, and wherein:

FIGURE 3 is a top plan view showing the general construction of the cooling ring of the present invention;

FIGURE 4 is a fragmentary view of a portion of the cooling ring of FIGURE 3 diagrammatically showing the interaction of a force field and an electric arc; and FIGURE 5 is a partial sectional view taken along the line V—V of FIGURE 3.

Figure 1:
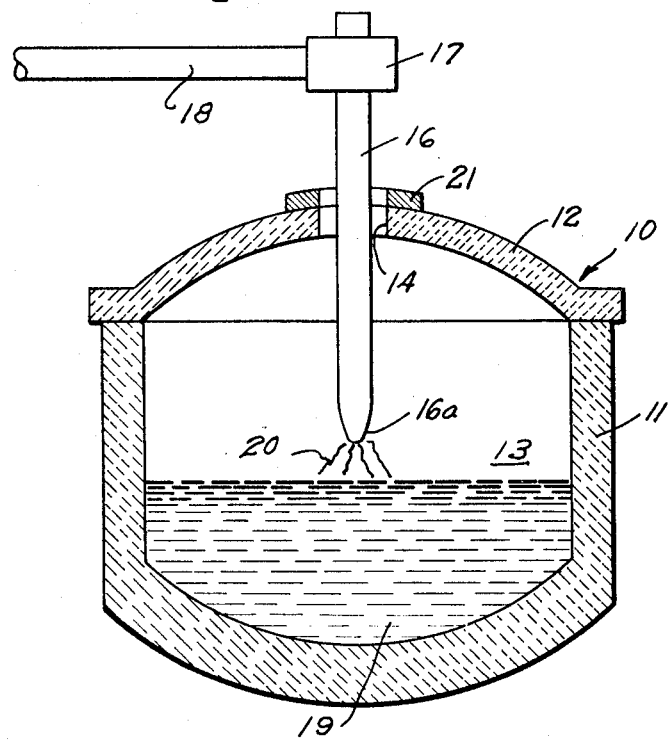
FIGURE 1 is an elevational sectional view showing diagrammatically an electric arc furnace of the type which incorporates the cooling ring of the present invention.

Seen in FIGURE 1 is a sectional diagrammatic representation of an electric arc furnace 10 which includes essentially a shell 11 and a cover or roof 12 which is secured to the shell 11 to define a metal receiving chamber 13.

The roof 12 is provided with a plurality of apertures each of which receive a current carrying electrode which is inserted into the chamber 13 of the furnace 10. For purposes of simplicity, and for a clear understanding of the problem which exists in electric arc furnaces of this type, only one aperture and one current carrying electrode is shown in FIGURE 1. An aperture 14 is formed in the roof 12 for receiving a current carrying electrode 16. One end of the current carrying electrode is connected to a bus terminal 17 exteriorly of the furnace 10. Connected to the bus terminal 17 is a support 18 which also serves to deliver current to the electrode 16.

The furnace 10 is charged with a quantity of metal 19 which is to be melted by a high intensity electric arc 20 which is established between the tip 16a of the electrode 16 and the metal charge 19.

During the normal operation of the electric arc furnace 10, the melting of the charge 19 causes hot gases to be created within the chamber 13. The hot gases escape through the space between the electrode 16 and the aperture 14. To prevent severe burning of the roof 12, in the vicinity of the aperture 14, a cooling ring 21 is secured to the roof 12 and positioned about the electrode 16. The cooling ring 21 may have an inside diameter substantially equal to the diameter of the aperture 14.

The cooling ring 21 is generally connected to a cooling-liquid source which may include a pump to continuously force cooling liquid through the cooling ring at a rate sufficient to provide efficient heat transfer from the roof 12, or from the hot gases passing through the aperture 14, into the cooling liquid circulating through the cooling ring 21.

During the operation of the electric arc furnace 10, metal particles are carried along with the hot gases and settle on the exterior surface of the roof 12 and on the cooling ring 21. These metal particles form a conductive dust, which if allowed to build up sufficiently will cause an electric arc to be established between the electrode 16 and the cooling ring 21. Furthermore, the conductive dust which is deposited on the exterior surface of the roof 12 may also cause a current path 22, of FIGURE 2, between respective different electrodes. Such a condition would severely impede the performance of a three-phase alternating current power source generally used for the operation of electric arc furnaces.

Figure 2:
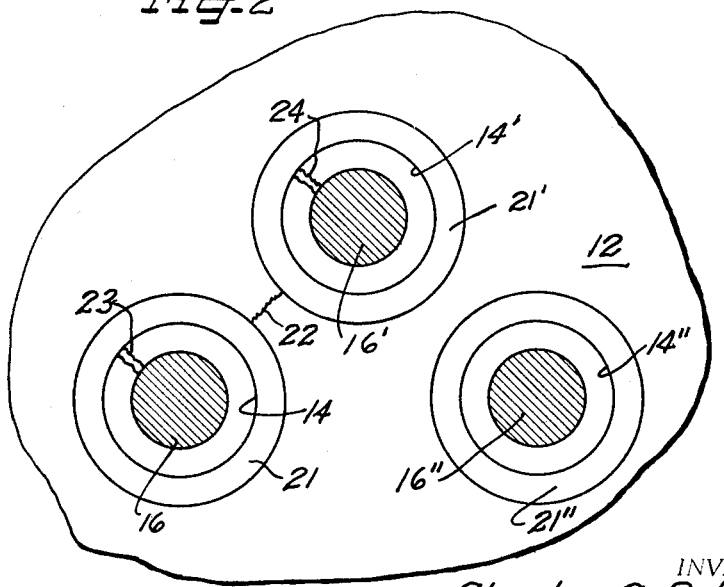
FIGURE 2 is a top plan view of the electric arc furnace of FIGURE 1.

For a better understanding of the problem involved, reference is now made to FIGURE 2 which illustrates a portion of the roof 12 which has three currents carrying electrodes passing therethrough, which current carrying electrodes are connected to respective different phases of a three-phase power source. Should sufficient metal particles collect on the surface of the roof 12, or should the arc length of the arc 20 established between the electrode 16 and the metal charge 19 become sufficiently long, thereby increasing the resistance of the arc 20, an electric arc 23 may be established between the electrode 16 and the inner periphery of the cooling ring 21. The arc 23, when established, is usually sufficiently intense to burn a hole through the cooling ring 21 and into the cooling jacket formed therein. The arc erosion of the cooling ring 21 not only causes a maintenance problem in that the cooling ring must be replaced, but also causes the refractory material of the roof 12 to become overheated. Therefore, the refractory material in the vicinity of the aperture 14 as well as the cooling ring 21 must be replaced.

Another problem which may occur is that the conductive dust which has settled on the exterior surface of the roof 12 will provide a current path 22 between the cooling rings 20 and 21' and a second arc 24 may be established between the electrode 16' and the cooling ring 21'. This action would short circuit two of the three phases of the power supply connected to the electrodes 16, 16' and 16" as well as cause arc erosion of the cooling ring 21'.

To overcome these problems, the present invention provides a method of reducing arc erosion of the cooling ring 21 when an electric arc is established between the inner periphery of the cooling ring and the electrode 16 passing therethrough. The novel concept of the present invention is in the provision of a force field which is established within the space between the electrode 16 and the inner peripheral surface of the cooling ring 21. Such a force field would act on the arc 23 to cause the arc path thereof to continuously rotate about the space between the electrode 16 and the cooling ring 21. In so doing, the time interval in which the arc 23 impinges upon the interior peripheral surface of the cooling ring 21 is greatly reduced and so also is the arc erosion caused thereby.

Seen in FIGURE 3 is a cooling ring 25 which is constructed in accordance with the principles of this invention. The cooling ring 25 is provided with a plurality of electromagnets 26 which are secured between inner and outer rings 27 and 28 respectively. In the illustrated embodiment, the electromagnets 26 are positioned such that the north pole of each of the magnets is directed radially outwardly of the cooling ring 25 and the south pole of each of the magnets is directed radially inwardly thereof. Each of the electromagnets may be constructed of a ferromagnetic core 29 which is wrapped with a plurality of turns of hollow copper tubing to form an energizing coil 30. Cooling liquid may be circulated through each of the coils 30 to maintain the cooling ring 25 and the roof portion adjacent thereto at the proper temperature.

Energization of the electromagnets 26 will establish a force field within the space between the inner periphery of the inner ring 27 and the electrode 16. The force field so established is orientated within the space to cause an arc which may be initiated therein to be acted upon by the force field. As best seen in FIGURE 4, the arc 23 will have an arc path which is perpendicular to a portion of the force field created by the electromagnet 26. Therefore, the arc 23 will not remain in a single position but rather will rotate about the space between the inner ring 27 and the electrode 16 due to the force field which is established therein.

For a better understanding of the present invention reference is now made to FIGURE 5. The flux path from each of the electromagnets 26, in the general sense, leaves the north pole and enters the south pole. Therefore, a portion of the flux path is always perpendicular to the arc path of the arm 23. Therefore, when the arc 23 is established between the electrode 16 and the inner ring 27 at the top edge thereof, as seen on the drawing, the direction of rotation of the arc path is indicated by the arrow head line 32. However, should the arc 23 be established near the lower edge of the inner ring 27 the direction of rotation of the arc path will be in the opposite direction as indicated by the arrow head line 33.

The electromagnets 26 may be energized simultaneously and orientated in such a manner as to cause the arc path of the arc 23 to rotate. On the other hand, the electromagnets 26 may be energized in sequence one after another to cause the arc 23 to move from one position to another in response to the particular electromagnet which is energized.

Therefore, the present invention has provided a new and improved cooling ring for mounting on the roof of an electric arc furnace and positioned about a current carrying electrode passing through the roof. One of the chief advantages of the present invention is in preventing an arc which is established between the cooling ring and the current carrying electrode passing therethrough from burning a hole through the cooling ring and into the cooling jacket thereof. This is accomplished by providing a force field within the space between the inner periphery of the cooling ring and the electrode thereby causing the arc path of an arc established therebetween to rotate. The rotating of the arc will reduce the average time in which the arc will impinge upon a particular incremental area of the cooling ring. Although the illustrative embodiment of the present invention has particular utility when used as a cooling ring in conjunction with electric arc furnaces, it is not to be construed as solely limited thereto.

Variations and modifications may be effected without departing from the spirit and scope of the novel concepts of this invention.

I claim as my invention:
1. An apparatus for reducing arc erosion comprising:
   a current carrying electrode;
   a member positioned about said current carrying electrode; and
   means for inducing a plurality of force fields between said member and said electrode to cause the arc path of an electric arc which is established therebetween to move about the inner periphery of said member.

2. The apparatus of claim 1 wherein said member is an annular ring which is positioned substantially concentric about said electrode.

3. The apparatus of claim 1 wherein said member is a cooling ring mounted on the roof of an electric arc furnace.

4. The apparatus of claim 1 wherein said member is mounted on the roof of an electric arc furnace and which member includes:
   first and second radially spaced apart annular rings,
   said electrode passing through the inner one of said rings,
   a plurality of magnetic means positioned between said first and second rings for producing said plurality of force fields radially inwardly of said inner ring between said inner ring and said electrode;

thereby causing rotation of the arc path of said electric arc which is established between said inner ring and said electrode.

5. The apparatus of claim 4 wherein said magnet means consists of a plurality of bar magnets positioned radially between said first and second rings to effect a magnetic field radially inwardly of said inner ring.

6. The apparatus of claim 4 wherein said magnetic means includes a plurality of electromagnets.

7. The apparatus of claim 6 wherein the coil of each of said electromagnets is wound of tubular stock to define a cooling liquid passage through said coil.

References Cited
UNITED STATES PATENTS

| | | | |
|---|---|---|---|
| 2,472,851 | 6/1949 | Landis et al. | 219—123 XR |
| 2,286,210 | 6/1942 | Klemperer et al. | 219—100 XR |
| 3,048,736 | 8/1962 | Emmerich | 313—161 |
| 3,097,321 | 7/1963 | Le Row et al. | 313—32 |
| 3,309,550 | 3/1967 | Wolf et al. | 219—123 XR |

BERNARD A. GILHEANY, *Primary Examiner.*

H. B. GILSON, *Assistant Examiner.*